United States Patent
Lamps et al.

(10) Patent No.: US 9,295,946 B2
(45) Date of Patent: Mar. 29, 2016

(54) AFTERTREATMENT MANIFOLD DEVICE

(71) Applicant: Cummins Emission Solutions Inc., Columbus, IN (US)

(72) Inventors: Michael Lamps, McFarland, WI (US); Scott Lubenow, Fitchburg, WI (US); Kyle Ebbe, Platteville, WI (US); James Goss, Madison, WI (US); Robert Nowicki, Stoughton, WI (US); Pat Klein, Madison, WI (US); Michael Welp, Oregon, WI (US); Jason Drost, Edgerton, WI (US); David Hall, Madison, IN (US); Aashish Wadke, Stoughton, WI (US); Jamie Zenger, Cottage Grove, WI (US); Jonathan Steele, Madison, WI (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 378 days.

(21) Appl. No.: 13/869,640

(22) Filed: Apr. 24, 2013

(65) Prior Publication Data

US 2013/0330237 A1  Dec. 12, 2013

Related U.S. Application Data

(63) Continuation of application No. 13/610,751, filed on Sep. 11, 2012, now abandoned.

(60) Provisional application No. 61/533,642, filed on Sep. 12, 2011, provisional application No. 61/533,643, filed on Sep. 12, 2011, provisional application No. 61/533,645, filed on Sep. 12, 2011.

(51) Int. Cl.
| | | |
|---|---|---|
| *B01D 53/88* | (2006.01) | |
| *B01D 53/94* | (2006.01) | |
| *F01N 3/10* | (2006.01) | |
| *F01N 13/18* | (2010.01) | |
| *F01N 13/00* | (2010.01) | |

(52) U.S. Cl.
CPC .............. *B01D 53/9477* (2013.01); *F01N 3/10* (2013.01); *F01N 13/008* (2013.01); *F01N 13/18* (2013.01);

(Continued)

(58) Field of Classification Search
CPC ..... B01D 53/9477; F01N 3/10; F01N 13/008; F01N 13/18; F01N 13/1805; F01N 13/1838; F01N 13/1844
USPC ............ 422/169, 170, 171, 177, 180; 29/890; 180/296, 89.2
See application file for complete search history.

(56) References Cited

U.S. PATENT DOCUMENTS

| | | | | |
|---|---|---|---|---|
| 7,517,380 B2 * | 4/2009 | Grimm et al. | .................... | 55/523 |
| 7,926,604 B2 * | 4/2011 | Ammer | ........................ | 180/89.2 |

(Continued)

FOREIGN PATENT DOCUMENTS

| | | |
|---|---|---|
| EP | 1717423 A1 | 11/2006 |
| EP | 2123878 A1 | 11/2009 |

(Continued)

OTHER PUBLICATIONS

European Search Report; Dec. 19, 2012; Application No. 12184093.8-2311.

(Continued)

*Primary Examiner* — Jill Warden
*Assistant Examiner* — Joye L Woodard
(74) *Attorney, Agent, or Firm* — Foley & Lardner LLP

(57) ABSTRACT

An aftertreatment subsystem includes first and second mounting interfaces, a fluid inlet and fluid outlet interface, and aftertreatment components, each having a central axis and axial extent. The central axes for the aftertreatment components are substantially parallel. End caps define fluid chambers that fluidly couple upstream aftertreatment component outlets with downstream aftertreatment components inlets. The end caps are positioned at a first or second end of the aftertreatment components. A first bracket joins the aftertreatment components at an axial position closer to the first end than to a center of the axial extent of any of the aftertreatment components and a second bracket joins the aftertreatment components at an axial position closer to the second end than to the center of the axial extent of any of the aftertreatment components. The first mounting interface is on the first bracket, and the second mounting interface is on the second bracket.

29 Claims, 10 Drawing Sheets

(52) U.S. Cl.
CPC ......... *F01N 2560/14* (2013.01); *F01N 2590/08* (2013.01); *F02D 2400/22* (2013.01); *Y02T 10/22* (2013.01); *Y10T 29/49229* (2015.01); *Y10T 29/49345* (2015.01)

(56) References Cited

U.S. PATENT DOCUMENTS

| | | | |
|---|---|---|---|
| 8,425,851 B2 * | 4/2013 | Kimura | 422/180 |
| 2007/0144146 A1 | 6/2007 | Kusatsugu | |
| 2008/0069742 A1 | 3/2008 | Toy et al. | |
| 2010/0000203 A1 * | 1/2010 | Kowada | 60/286 |
| 2011/0120085 A1 | 5/2011 | Saito et al. | |

FOREIGN PATENT DOCUMENTS

| | | |
|---|---|---|
| EP | 2 184 458 | 5/2010 |
| EP | 2192284 A1 | 6/2010 |
| EP | 2202390 A1 | 6/2010 |
| JP | 2008274851 A | 11/2008 |
| WO | 2007050384 A2 | 5/2007 |
| WO | WO2009/028179 * | 3/2009 |

OTHER PUBLICATIONS

European Search Report; Jan. 17, 2013; Application No. 12184135.7-2311.

Partial European Search Report, EPO, EP 12184135.7, Lamps et al., Dec. 19, 2012.

English Abstract of JP 2008274851A to Hino Motors, Ltd, Nov. 13, 2008.

Extended European Search Report, EPO, EP 12184135.7, Lamps et al., Jan. 17, 2013.

Office Action issued in European Patent Application No. 12184135.7, dated Jun. 30, 2015.

* cited by examiner

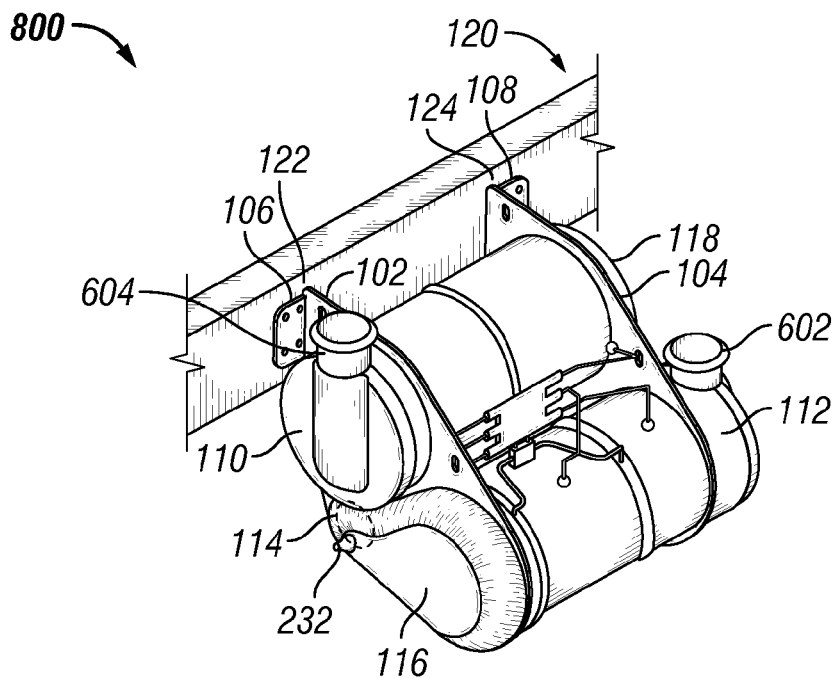
FIG. 8
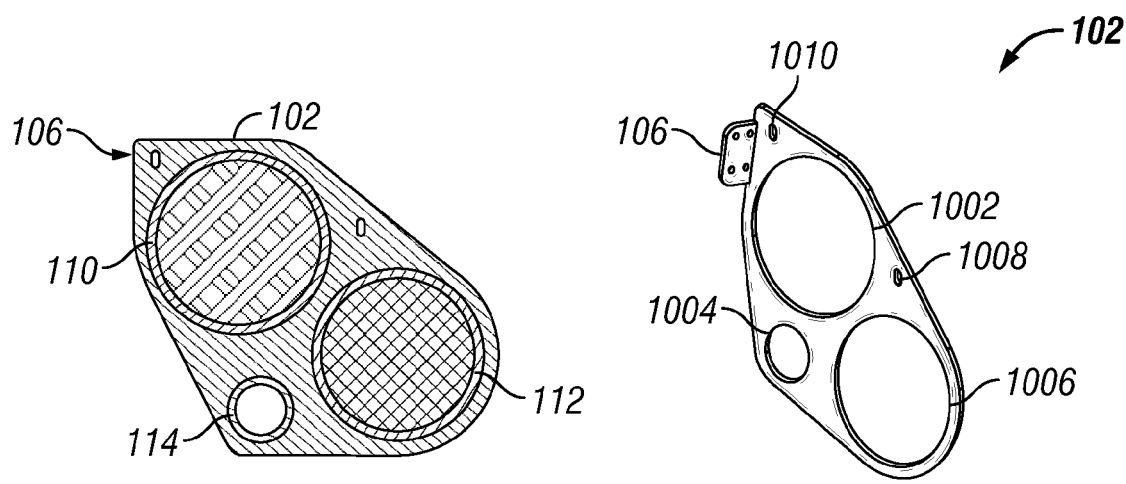
FIG. 9  FIG. 10

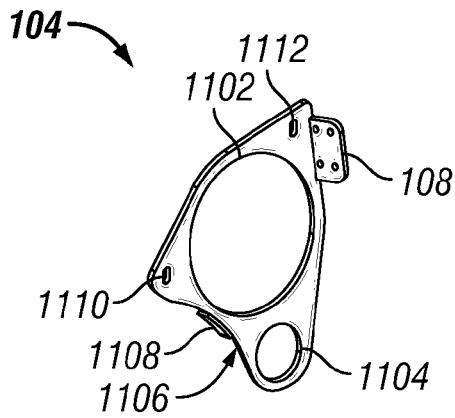
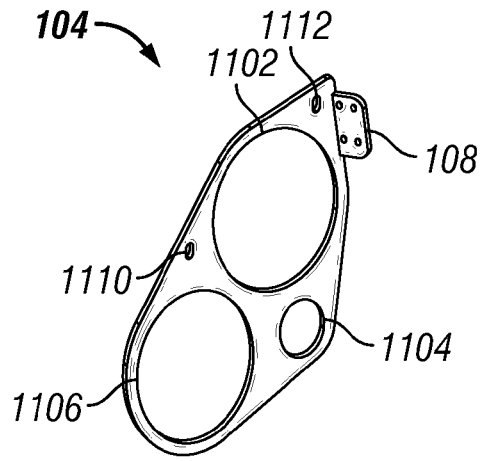
FIG. 11A  FIG. 11B
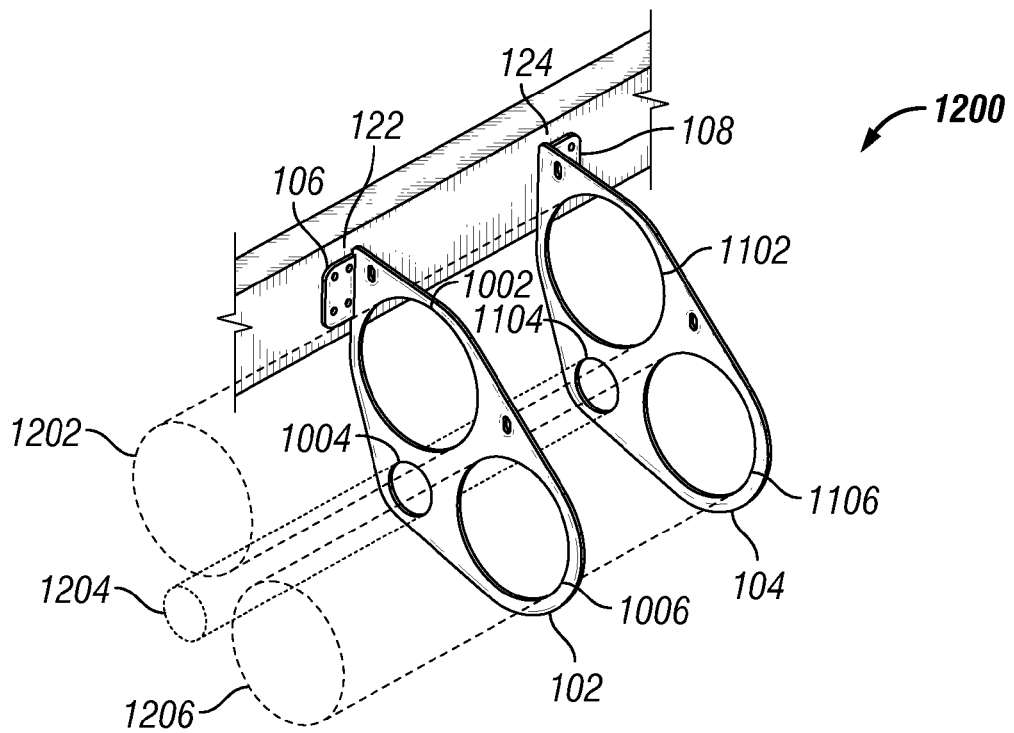
FIG. 12

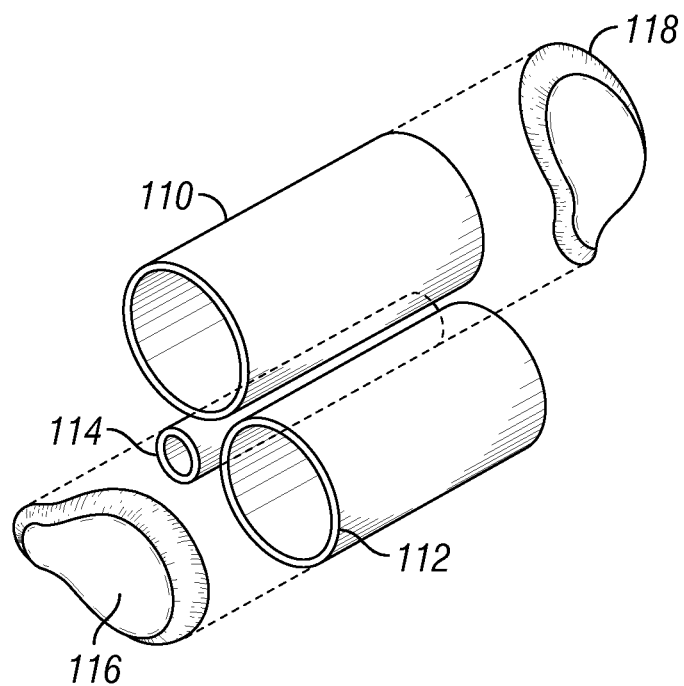
FIG. 16
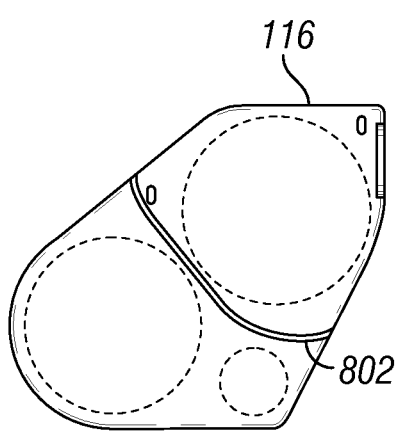 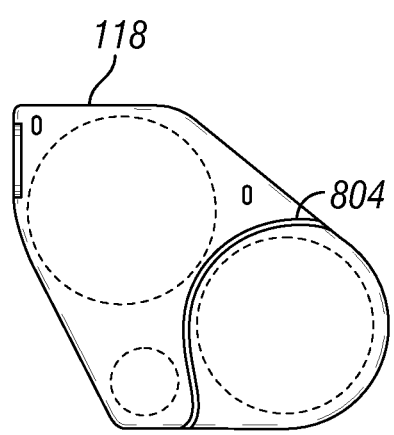
FIG. 17A  FIG. 17B

US 9,295,946 B2

AFTERTREATMENT MANIFOLD DEVICE

RELATED APPLICATIONS

The present application is a Continuation of U.S. patent application Ser. No. 13/610,751 titled "AFTERTREATMENT MANIFOLD DEVICE", a pending case filed on 11 Sep. 2012, which claims the benefit of U.S. Provisional Application Nos. 61/533,642 titled "AFTERTREATMENT MANIFOLD DEVICE", filed 12 Sep. 2011; U.S. Provisional Application No. 61/533,643 titled "INTEGRATED MOUNTING BRACKETS FOR AFTERTREATMENT DEVICE", filed 12 Sep. 2011; and, U.S. Provisional Application No. 61/533,645 titled "SENSOR CONNECTION INTEGRATION DEVICE", filed 12 Sep. 2011. All of the applications listed in this paragraph have the same assignee as the present application, and all applications are incorporated herein by reference in their entirety for all purposes.

BACKGROUND

The technical field generally relates to internal combustion engine aftertreatment systems, and more particularly but not exclusively relates to integrating aftertreatment devices into a vehicle. Modern systems that include internal combustion engines often include an aftertreatment system to reduce emissions. Aftertreatment systems often include multiple components, including particulate filters, oxidation catalysts, NOx adsorbers, NOx reduction catalysts, three-way catalysts, four-way catalysts, and can further include multiple components of the same type at various locations along the aftertreatment system flowpath. The inclusion of an aftertreatment system introduces various system integration complications. The aftertreatment system occupies space that must be accounted for in the system design (e.g., in the engine compartment of a vehicle), and where multiple aftertreatment components are included there are multiple points of integration. The points of integration include sensor connections, flow point connections, injector connections, and any other operational interaction between parts of the aftertreatment system and the external system in which the aftertreatment system is installed.

Multiple points of integration introduce further complications, including tracking specifications for each integration point, the stackup of multiple tolerance values creating greater variance in installation parameters such as total exhaust pipe length, and increased possibility of installing a component in the incorrect place (e.g. swapping two components or connectors) or in the incorrect position (e.g installing a component backwards). Therefore, further improvements in this area of technology are desirable.

SUMMARY

One embodiment is a unique assembly packaging components in an aftertreatment system. Another embodiment is a unique integrated bracket apparatus for an aftertreatment system. Further embodiments, forms, objects, features, advantages, aspects, and benefits shall become apparent from the following description and drawings.

BRIEF DESCRIPTION OF THE DRAWINGS

FIG. 8 is a schematic illustration of an article of manufacture.

FIG. 9 is a schematic cutaway drawing of a first bracket.

FIG. 10 is a schematic drawing of the a first bracket.

FIG. 11A is a schematic drawing of a second bracket.

FIG. 11B is a schematic drawing of another embodiment of a second bracket.

FIG. 12 is a schematic drawing of cross-sectional shapes of a first bracket aligned with cross-sectional shapes of a second bracket.

FIG. 16 is a schematic diagram illustrating an article of manufacture including end caps.

FIG. 17A is a schematic diagram illustrating an article of manufacture including a first end cap.

FIG. 17B is a schematic diagram illustrating an article of manufacture including a second end cap.

DESCRIPTION OF THE ILLUSTRATIVE EMBODIMENTS

Figure 1:
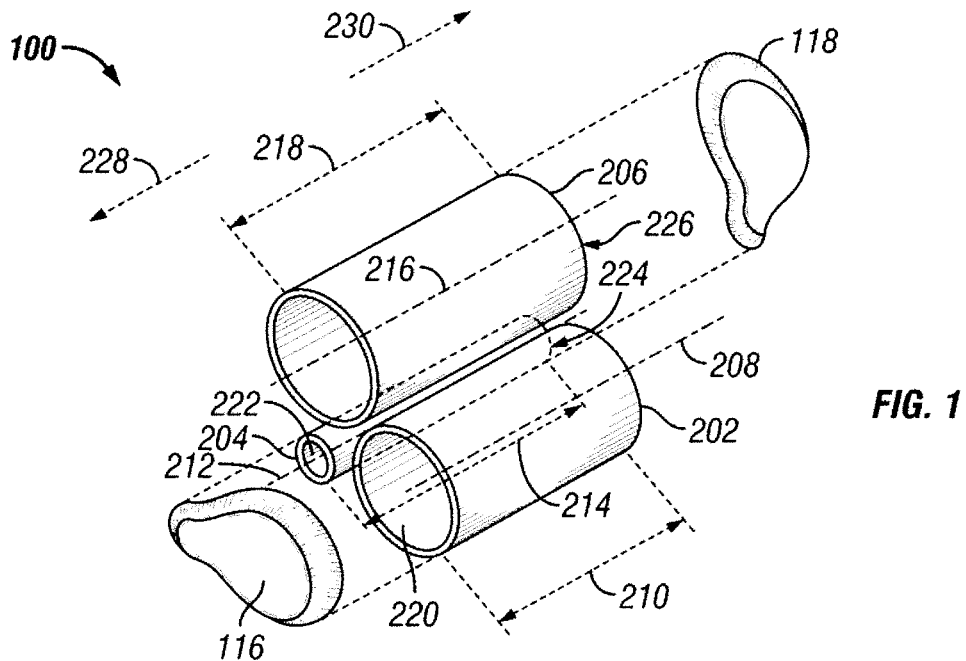
FIG. 1 is a schematic illustration of a system having multiple aftertreatment components each having a central axis and an axial extent.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is an exploded schematic illustration of portions of a system 100 having multiple aftertreatment components each having a central axis and an axial extent. The system 100 for treating exhaust gas of an internal combustion engine includes a first aftertreatment component 202 having a first central axis 208 and a first axial extent 210, a second aftertreatment component 204 having a second central axis 212 and a second axial extent 214, and a third aftertreatment component 206 having a third central axis 216 and a third axial extent 218. The first, second, and third central axes 208, 212, 216 are substantially parallel. Substantially parallel as used herein includes any arrangement of components 202, 204, 206 that are generally aligned with each other, including arrangements wherein the central axes 208, 212, 216 are parallel. In certain embodiments, substantially parallel includes arrangements wherein all of the central axes 208, 212, 216 are within twenty degrees of each other, e.g. wherein the greatest misalignment of any two of the three central axes 208, 212, 216 when projected on a plane does not exceed twenty degrees. The flow through components 202, 204, 206 may not be exactly linear, and the central axes 208, 212, 216 may be defined as a flow-area average, center of mass average, and/or geometric average through the component 202, 204, 206.

The second axial extent 214 and the third axial extent 218 are shared, partially or fully, with the first axial extent 210. Two axial extents are considered shared when, for example, a perpendicular projection line can be created from the first central axis 208 within the first axial extent 210 such that the projection line intersects the second central axis 212 within the second axial extent 214.

The system 100 includes a first end cap 116 at a first end 228, the first end cap 116 defining a first fluid chamber that fluidly couples an outlet of the first aftertreatment component 220 with an inlet of the second aftertreatment component 222, and a second end cap 118 at a second end 230, the second end cap 118 defining a second fluid chamber that fluidly couples an outlet of the second aftertreatment component 224 with an inlet of the third aftertreatment component 226. For example, the first end cap 116 sealingly covers the outlet of the first aftertreatment component 220 and the inlet of the second aftertreatment component 222 such that fluid flowing out of the first aftertreatment component 202 flows into the second aftertreatment component 204.

The first end cap 116 includes the cross-sectional area of the first aftertreatment component 202 and the cross-sectional area of the second aftertreatment component 204. Thus, the first end cap 116 entirely covers the outlet of the first aftertreatment component 220 and the inlet of the second aftertreatment component 222. The second end cap 118 includes the cross-sectional area of the second aftertreatment component 204 and the cross-sectional area of the third aftertreatment component 206. Thus, the second end cap 118 entirely covers the outlet of the second aftertreatment component 224 and the inlet of the third aftertreatment component 226. In certain embodiments, the system 100 does not include pipe elbows (not shown).

Figure 2:
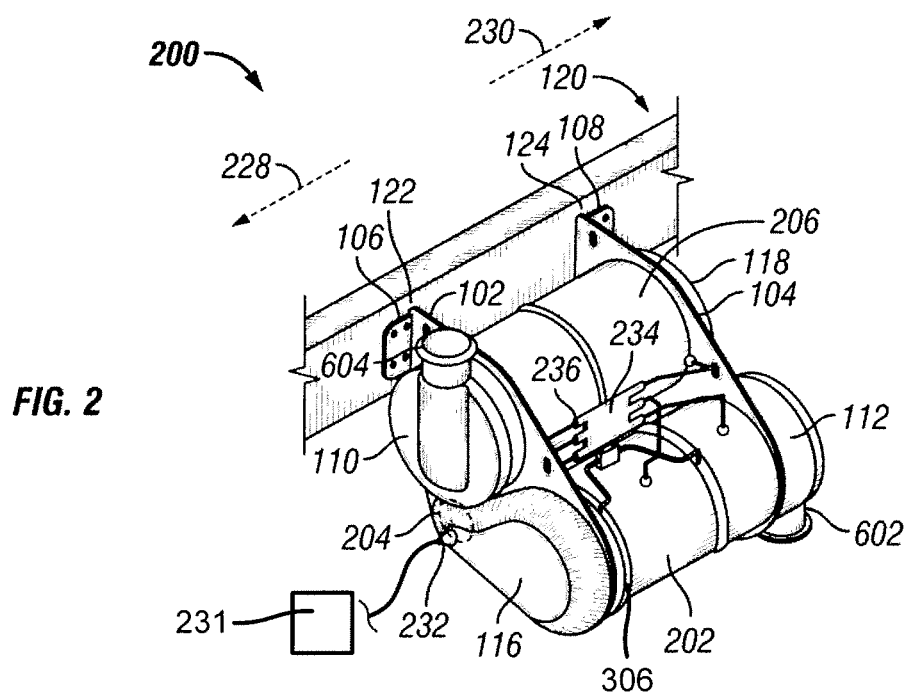
FIG. 2 is a schematic illustration of a system for packaging aftertreatment components.

FIG. 2 is a schematic illustration of a system 200 for packaging aftertreatment components. The system 200 includes an aftertreatment subsystem having aftertreatment components 202, 204, 206. Each aftertreatment component includes a corresponding central axis and axial extent (e.g., reference FIG. 1 and related text). Each aftertreatment component has a first end (e.g. towards first end 228) and an opposing second end (e.g. towards second end 230). The central axes for the plurality of aftertreatment components 202, 204, 206 are substantially parallel, and/or within twenty degrees of parallel, and at least a portion of the axial extents for the plurality of aftertreatment components 202, 204, 206 are mutually shared.

The aftertreatment subsystem further includes a first end cap 116 and a second end cap 118, each end cap 116, 118 defining a fluid chamber that fluidly couples an outlet of an upstream aftertreatment component with an inlet of a downstream aftertreatment component. For example, the first aftertreatment component 202 is upstream of the second aftertreatment component 204, and the second aftertreatment component 204 is upstream of the third aftertreatment component 206. The first end cap 116 fluidly couples the outlet of the first aftertreatment component 202 with the inlet of the second aftertreatment component 204, and the second end cap 118 fluidly couples the outlet of the second aftertreatment component 204 to the inlet of the third aftertreatment component 206. Each end cap is positioned at one of the first end and the second end of the upstream and downstream aftertreatment components. In the illustration of FIG. 2, the first end cap 116 is positioned at the first end of the first aftertreatment component 202 and the second aftertreatment component 204, and the second end cap 118 is positioned at the second end of the second aftertreatment component 204 and the third aftertreatment component 206. The aftertreatment subsystem includes a fluid inlet interface 602 coupled to a first aftertreatment component 202 and a fluid outlet interface 604 coupled to a last aftertreatment component, which in the illustration of FIG. 2 is the third aftertreatment component 206.

The exemplary system 200 further includes a first bracket 102 having a first mounting interface 106, where the first bracket 102 joins the first aftertreatment component 202, the second aftertreatment component 204, and the third aftertreatment component 206 at an axial position closer to the first end 228 than to a center of the second axial extent. In a further embodiment, the first bracket 102 joins the first aftertreatment component 202, the second aftertreatment component 204, and the third aftertreatment component 206 at a position near the first end 228. In a further embodiment, the second bracket 104 joins the first aftertreatment component 202, the second aftertreatment component 204, and the third aftertreatment component 206 at a position near the second end 230.

The system 200 further includes a second bracket 104 having a second mounting interface 108, where the second bracket 104 joins the first aftertreatment component 202, the second aftertreatment component 204, and the third aftertreatment component 206 at an axial position closer to the second end 230 than to a center of the second axial extent. In certain embodiments, first mounting interface 106 and the second mounting interface 108 define a plane that is part of an application mounting interface 120. For example, the first mounting interface 106 and the second mounting interface 108 may be configured to attach to a vehicle rail, a mounting bracket, or other similar feature as part of an application. In certain embodiments, the application mounting interface 120 is not a plane; the application mounting interface 120 can be any mounting structure available on the application.

The first bracket 102 and the second bracket 104 can be any appropriate materials known in the art, and in certain embodiments the first bracket 102 and the second bracket 104 are stamped metal. The vibration profile of the application at the application mounting interface 120, the temperature environment of the first bracket 102 and the second bracket 104, and the weight of the aftertreatment components 202, 204, 206 are among the factors determining appropriate materials for the brackets 102, 104.

The illustration of FIG. 2 shows the second bracket 104 encircling each of the aftertreatment components 202, 204, 206. However, the aftertreatment components 202, 204, 206 may be joined by the brackets 102, 104 in any known configuration. For example and without limitation, the second bracket 104 in certain embodiments does not encircle the first aftertreatment component 202, but instead the second bracket 104 includes a protrusion and a band clamp 306 attaches the first aftertreatment component 202 to the second bracket 104 by encircling the first aftertreatment component 202 and the protrusion.

In a further embodiment, the aftertreatment subsystem includes a reductant injector interface 232 positioned one of the end caps 116, or on a housing of one of the aftertreatment components 202. The reductant injector interface 232 is structured to receive a reductant injector 231, which may be a reductant utilized by one or more aftertreatment components 202, 204, 206. In certain embodiments, the reductant injector interface 232 is structured to position the reductant injector 231 at an upstream side of the second aftertreatment component 204, which may be a decomposition tube, such that the reductant has a residence time in the second aftertreatment component 204 before reaching the third aftertreatment component 206. In a further embodiment, the aftertreatment subsystem includes a wiring harness interface 236 coupled to a housing of one of the aftertreatment components 202, 204, 206.

Figure 4:
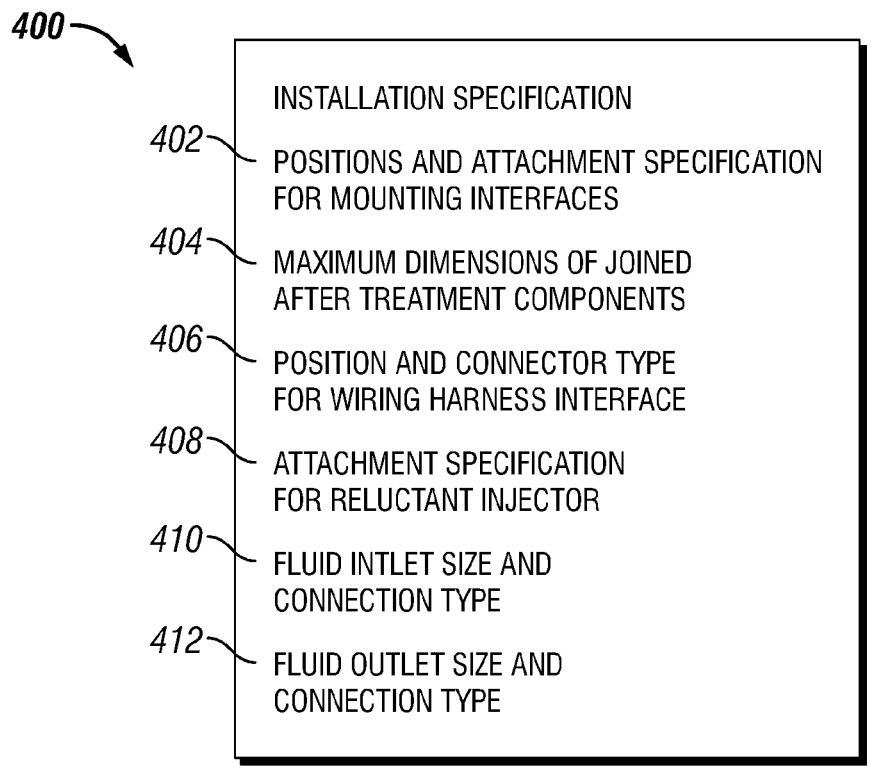
FIG. 4 is an illustration of an installation specification.

Referencing FIG. 4, the aftertreatment subsystem further includes an installation specification 400 having specification value(s) including relative positions and attachment means specification of the first and second mounting interfaces 402, maximum dimensions of the joined aftertreatment components 404, position and connector type for the wiring harness interface 406, attachment means specification for the reductant injector 408, a size and connection type for the fluid inlet interface 410, and/or a size and connection type for the fluid outlet interface 412. In a still further embodiment, the aftertreatment subsystem does not include any other interfaces beyond the first mounting interface, the second mounting interface, the fluid inlet interface, the fluid outlet interface, the reductant injector interface, and the wiring harness interface. For example, the aftertreatment subsystem presented in the illustration 200 has simplified interfaces where the original equipment manufacturer (or other downstream user of the aftertreatment subsystem) does not have to interface with anything beyond the fluid inlet interface 602, fluid outlet interface 604, the wiring harness interface 236, the reductant injector interface 232, and the mounting interfaces 106, 108 despite the aftertreatment subsystem including multiple aftertreatment components 202, 204, 206.

For example, the relative positions and attachment means specification of the first and second mounting interfaces 402 may include geometric position data (absolute or relative) of the first mounting interface 106 and the second mounting interface 108, and further includes the number and type of attachment means (e.g. bolt size). In another example, the maximum dimensions of the joined aftertreatment components 404 may include a maximum vertical, axial, and/or depth measurement for the aftertreatment subsystem including the aftertreatment components 202, 204, 206, end caps 116, 118, fluid inlet interface 602 and fluid outlet interface 604, and the brackets 102, 104. In another example, the position and connector type for the wiring harness interface 406 includes the pin, connector, and key information for the wiring harness interface 236. In another example, the attachment means specification for the reductant injector 408 includes boss size and threading, reductant line sizing and connection specifications, and/or any other information required to interface a reductant injector to the reductant injector interface 232, and/or to interface a reductant line to a reductant injector where the reductant injector is pre-assembled with the aftertreatment subsystem.

Referencing FIG. 2, the exemplary system 200 includes a sensor table 234 mounted on a housing 110 defining the third aftertreatment component 206. The sensor table 234 includes the wiring harness interface 236, which may be connected to an electronic controller (not shown) that reads values from various sensors on the aftertreatment subsystem. The sensor table 234 further includes inputs from the various sensors on the aftertreatment subsystem, including sensors to detect temperatures, pressures, and/or flow rates from various positions in the aftertreatment subsystem. A reductant injector connected to the reductant injector interface 232 may be present and structured to inject reductant into the first fluid chamber defined in the first end cap 116.

Figure 3A:
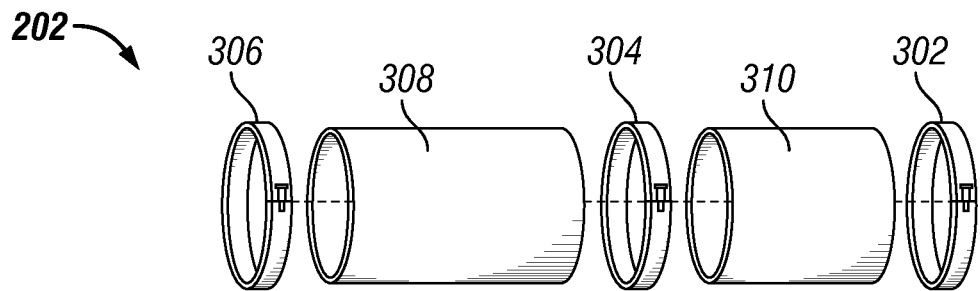
FIG. 3A is an illustration of a disassembled aftertreatment component.
Figure 3B:
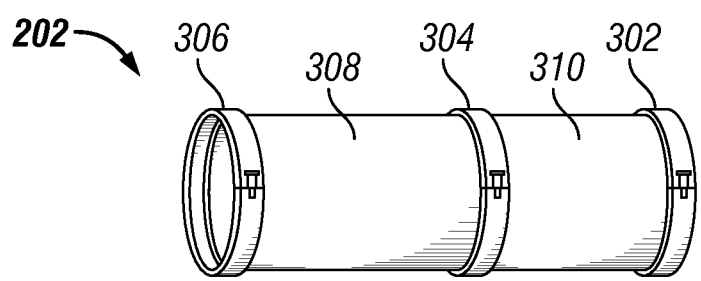
FIG. 3B is an illustration of an assembled aftertreatment component.

FIG. 3A is an illustration of a disassembled aftertreatment component 202. In the illustration of FIG. 3A, the aftertreatment component includes a first sub-component 310 and a second sub-component 308. The sub-components 310 are joined with a second band clamp 304, and attached to the aftertreatment subsystem with a first band clamp 302 and a third band clamp 306. In certain embodiments, the second sub-component 308 is removable by loosening the second band clamp 304 and the third band clamp 306, allowing the second sub-component 308 to be removed from the aftertreatment subsystem without removing other parts of the aftertreatment subsystem. In one example, the first aftertreatment component 202 includes a diesel oxidation catalyst 310 positioned upstream of a particulate filter 308, and the particulate filter 308 is conveniently removable for cleaning and/or replacement. Any of the aftertreatment components 202, 204, 206 may include sub-components, and the arrangement of sub-components may be any arrangement understood in the art. FIG. 3B is an illustration of the first aftertreatment component 202 as the component 202 may be assembled and positioned in the aftertreatment subsystem.

Figure 5:
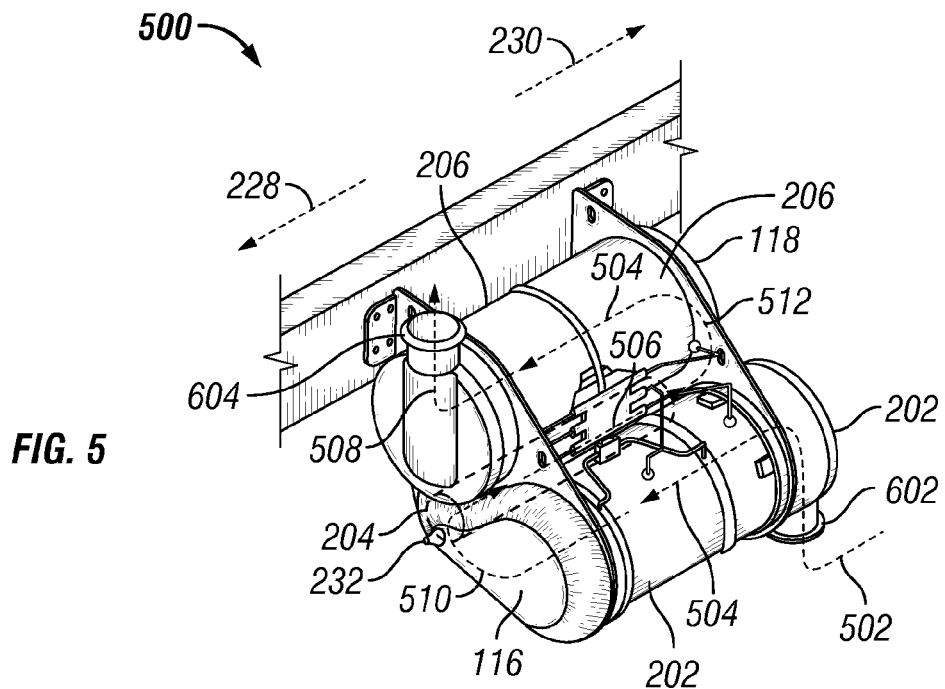
FIG. 5 is a schematic diagram of exhaust gas flow through an aftertreatment system.

FIG. 5 is a schematic diagram 500 of exhaust gas flow through an aftertreatment subsystem. The exhaust flow 502 enters the fluid inlet interface 602, and flows through the first aftertreatment component 202 in a first direction 504. The exhaust flow substantially reverses flow direction 510 through the first end cap 116 and flows through the second aftertreatment component 204 in a second direction 506. The exhaust flow substantially reverses flow direction 512 through the second end cap 118, and flows through the third aftertreatment component 206 in the first direction 504. The exhaust flow exits 508 the aftertreatment subsystem through the fluid outlet interface 604.

In an exemplary embodiment, the first aftertreatment component 202 includes a diesel oxidation catalyst in series with a diesel particulate filter, the second aftertreatment component 204 includes a flow pipe, and the third aftertreatment component 206 includes a selective catalytic reduction catalyst in series with an ammonia oxidation catalyst. The first aftertreatment component 202 further includes the fluid inlet interface 602 that projects from the first aftertreatment component 202 at the second end 230 of the first aftertreatment component 202, and the third aftertreatment component 206 further includes a fluid outlet interface 604 that projects from the third aftertreatment component 206 at the first end 228 of the third aftertreatment component 206. The first end 228 includes a furthest extent of any of the aftertreatment components 202, 204, 206 in a first axial direction, and the second end 230 includes a furthest extent of any of the aftertreatment components 202, 204, 206 in an opposite axial direction. The first end 228 and second end 230 may further include a furthest extent of any component of the aftertreatment subsystem, including the end caps 116, 118 and/or the reductant injector interface 232.

In the illustration of FIG. 8, the first aftertreatment component 112 includes a fluid inlet interface 602 that receives an exhaust gas from an internal combustion engine. The first aftertreatment 112 component includes a particulate filter that removes particulate matter from the exhaust gas. The second aftertreatment component 114 includes a flow tube providing residence time to exhaust gas, for example allowing reductant from an injector 232 time at exhaust temperature to vaporize and decompose. The third aftertreatment component 110 includes a NOx treatment catalyst that utilizes the reductant to remove NOx from the exhaust gas. The third aftertreatment component 110 further includes a fluid outlet interface 604 that provides treated exhaust gas to a downstream component, for example an exhaust stack (not shown). The selection and arrangement of aftertreatment components 110, 112, 114 are exemplary only, and any aftertreatment components and arrangement known in the art are contemplated herein.

The article 100 further includes a second bracket 104 having a second mounting interface 108, the second bracket 104 defining a second set of aftertreatment engagement features. Referencing FIG. 11A, the second bracket 104 includes at least a portion of the first cross-sectional shape 1102, the second cross-sectional shape 1104, and the third cross-sectional shape 1106. In the illustration of FIG. 11A, the second bracket 104 includes only a portion of the third cross-sectional shape 1106, although any or all of the cross-sectional shapes may be only partially present. The cross-sectional shapes 1102, 1104, 1106 are sized to allow passage of an aftertreatment component therethrough. FIG. 11B illustrates an alternate embodiment of the second bracket 104, wherein each cross-sectional shape 1102, 1104, 1106 is defined in the second bracket 104 in the entirety.

The first bracket 102 and second bracket 104 are structured such that, when the first mounting interface 106 is mounted on a first mounting surface 122 and the second mounting interface 108 is mounted on a second mounting surface 124, the cross-sectional shapes 1002, 1004, 1006 of the first bracket align with the cross-sectional shapes 1102, 1104, 1106 of the second bracket. In a further embodiment, the first mounting surface 122 and the second mounting surface 124 define a plane 120, for example a rail of a vehicle. In certain embodiments, the mounting surfaces 122, 124 may be separate surfaces, for example one surface 122 being on a vehicle rail and another surface 124 being on a vehicle bulkhead. The described surfaces are non-limiting examples. Referencing FIG. 12, the cross-sectional shapes, in certain embodiments, include a first circle sized 1102 to allow passage of a selective-reduction catalyst housing, a second circle 1106 sized to allow passage of a diesel particulate filter housing, and a third circle 1104 sized to allow passage of a flow tube housing.

Figure 14:
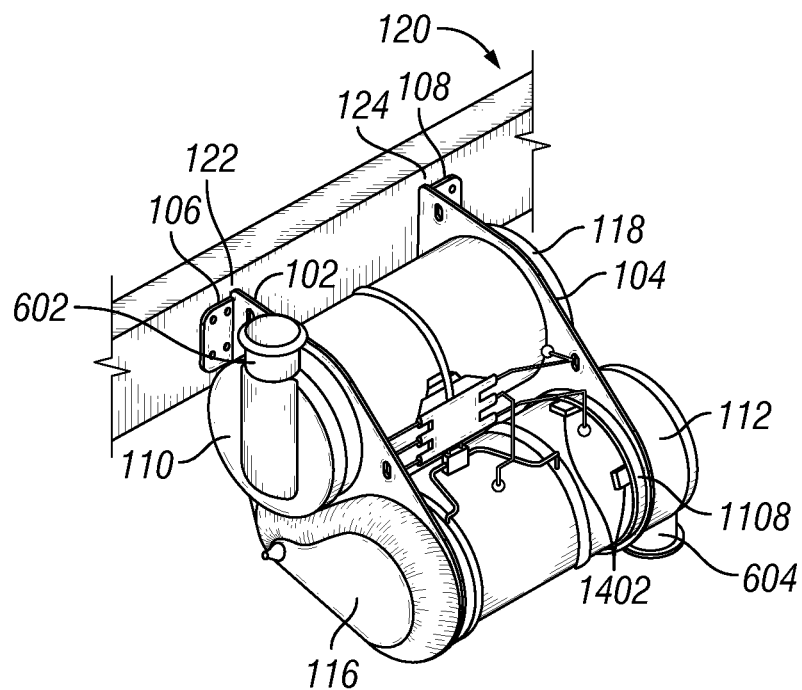
FIG. 14 is a schematic illustration of an article of manufacture where a second bracket includes a receiving surface.
Figure 15:
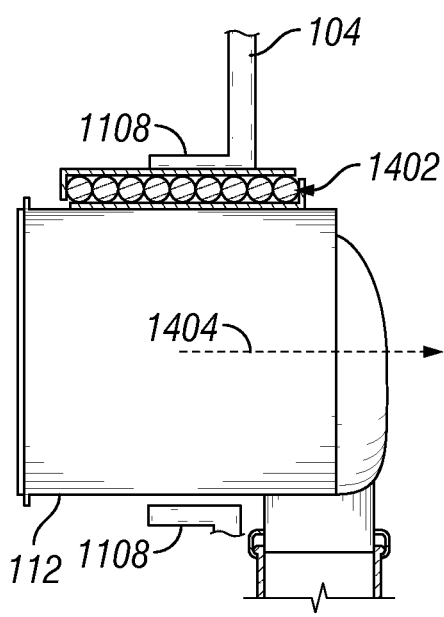
FIG. 15 is a schematic illustration of a first aftertreatment component engaging the receiving surface with a roller bearing.

Referencing FIG. 11A, an exemplary second bracket 104 includes a receiving surface 1108 that extends around at least a portion of an edge of the third cross-sectional shape 1106, in a perpendicular plane to the cross-sectional shape 1106. In a further embodiment, each of the first and second brackets further include means for attaching a lifting device. In a further embodiment, the first mounting surface and the second mounting surface define a plane. Referencing FIG. 14, in certain embodiments the first aftertreatment component 112 engages the receiving surface 1108 with a plurality of roller bearings 1402. The roller bearings 1402 allow easy removal of the aftertreatment component 112 by sliding in the direction 1404. In certain embodiments, the roller bearings 1402 are spaced around the aftertreatment component 112 to ensure proper positioning and stability of the aftertreatment component 112. In an exemplary embodiment, the first aftertreatment component 112 includes a particulate filter which is periodically removed for cleaning, inspection, repair, and/or replacement. The first aftertreatment component 112 may be fixed into the first bracket 102 and second bracket 104 by attachment to an end cap 116, by attachment to a bracket 102, 104 by a band clamp, and/or by other attachment means understood in the art.

Figure 13:
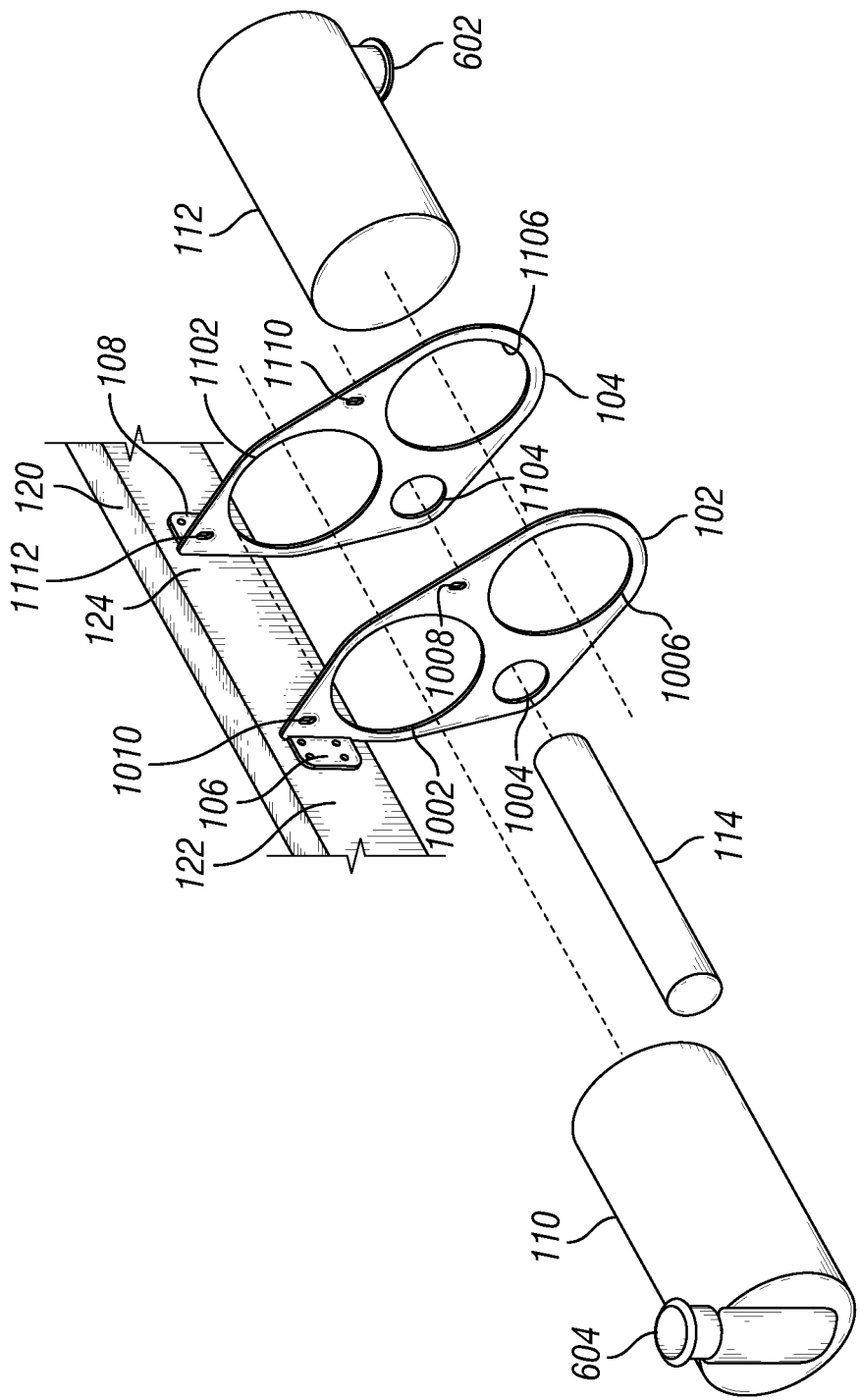
FIG. 13 is a schematic drawing illustrating aftertreatment components each having a cross-sectional shape and a distinct size.

Referencing FIG. 13, an article is shown having each of the first and second brackets 102, 104 further including means for enforcing directional installation of one or more of the aftertreatment components 110, 112, 114. The illustration of FIG. 13 includes the fluid inlet interface 602 and fluid outlet interface 604 ensuring the first aftertreatment component 112 and third aftertreatment component 110 are installed in the proper flow direction. Further, the cross-sectional shapes 1002, 1004, 1006 have distinct sizes such that the first aftertreatment component 112, second aftertreatment component 114, and third aftertreatment component 110 are installed into the correct cross-sectional shapes 1002, 1004, 1006 and 1102, 1104, 1106. Other means for enforcing directional installation of aftertreatment components include keying notches and/or markings (not shown) on the aftertreatment components and/or cross-sectional shapes, and/or distinct shapes for each of the cross-sectional shapes 1002, 1004, 1006 and 1102, 1104, 1106.

Referencing FIG. 16, end caps 116, 118 are illustrated. The first end cap 116 defines a fluid chamber that fluidly couples an outlet of the first aftertreatment component 112 to an inlet of the second aftertreatment component 114. The second end cap 118 defines a fluid chamber that fluidly couples an outlet of the second aftertreatment component 114 to an inlet of the third aftertreatment component 110. In certain embodiments, the end caps 116, 118 define a cross-sectional area covering the connected aftertreatment components, for example as illustrated in FIG. 16. In certain embodiments, the end caps 116, 118 define a cross-sectional area greater than the connected aftertreatment components, such as the entire cross-sectional area of all included aftertreatment components (e.g. three or more). Referencing FIG. 17A, the first end cap 116 includes the cross-sectional area of three aftertreatment components, and includes a septum 802 (or divider) that enforces flow between the first aftertreatment component 112 and the second aftertreatment component 114 when installed on the article 100. Referencing FIG. 17B, the second end cap 118 includes the cross-sectional area of three aftertreatment components, and includes a septum 804 (or divider) that enforces flow between the second aftertreatment component 114 and the third aftertreatment component 110 when installed on the article 100.

In certain embodiments, a kit for installing an aftertreatment system package includes a first aftertreatment component 112 having a first cross-sectional shape, a second aftertreatment component 114 having a second cross-sectional shape, and a third aftertreatment component 110 having a third cross-sectional shape. The kit includes a first bracket 102 having a first mounting interface 106, where the first bracket 102 defines a first set of aftertreatment engagement features 1002, 1004, 1006.

The first set of aftertreatment engagement features 1002, 1004, 1006 includes at least a portion of each of the first cross-sectional shape, the second cross-sectional shape, and the third cross-sectional shape. The kit includes a second bracket 104 having a second mounting interface 108, where the second bracket 104 defines a second set of aftertreatment engagement features 1102, 1104, 1106. The second set of aftertreatment engagement features 1102, 1104, 1106 includes at least a portion of a each of the first cross-sectional shape, the second cross-sectional shape, and the third cross-sectional shape. The first bracket 102 and second bracket 104 are structured such that, when the first mounting interface 106 is mounted on a first mounting surface 122 and the second mounting interface 108 is mounted on a second mounting surface 124, the cross-sectional shapes of the first bracket 1002, 1004, 1006 align with the cross-sectional shapes of the second bracket 1102, 1104, 1106. In a further embodiment, the first mounting surface 122 and the second mounting surface 124 define a plane 120.

The exemplary kit includes the first aftertreatment component 112 as a diesel particulate filter, the second aftertreatment component 114 as a flow tube, which may be a decomposition tube, and the third aftertreatment component 110 as a selective catalytic reduction component. The first and second brackets 102, 104 further include means for attaching a lifting device. In certain embodiments, the means for attaching a lifting device comprise a number of lift points 1008, 1010, 1110, 1112. Other means for attaching a lifting device include lift points near a center of gravity for the aftertreatment subsystem including the brackets 102, 104 and the aftertreatment components, and/or lift points distributed around the center of gravity for the aftertreatment subsystem. The lift points may comprise attachable holes as shown in FIGS. 8-14 and FIGS. 17A and 17B, but may also be notches, hooks, protrusions, or other features that facilitate attachment of a lifting device.

Each of the first and second brackets 102, 104 further include means for enforcing directional installation of aftertreatment components. In certain embodiments, the first cross-sectional shape, second cross-sectional shape, and third cross-sectional shape each have a distinct size. The exemplary kit further includes a first end cap 116 that fluidly couples an outlet of the first aftertreatment component 112 to an inlet of the second aftertreatment component 114, and a second end cap 118 that fluidly couples an outlet of the second aftertreatment component 114 to an inlet of the third aftertreatment component 110.

Figure 6:
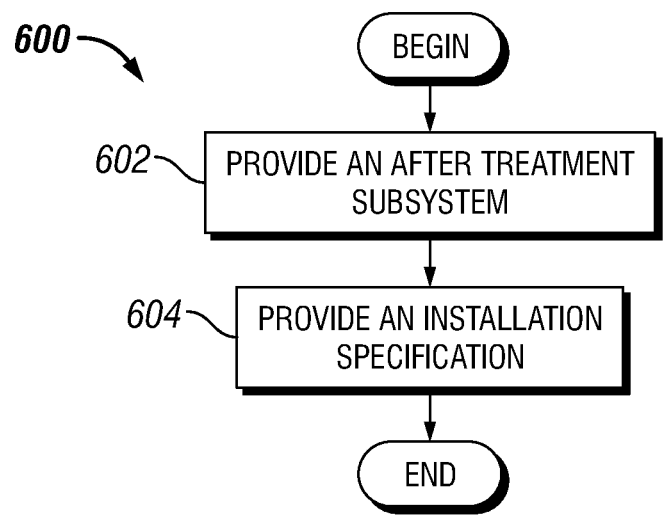
FIG. 6 is a schematic flow diagram of a procedure for supplying an aftertreatment system.
Figure 7:
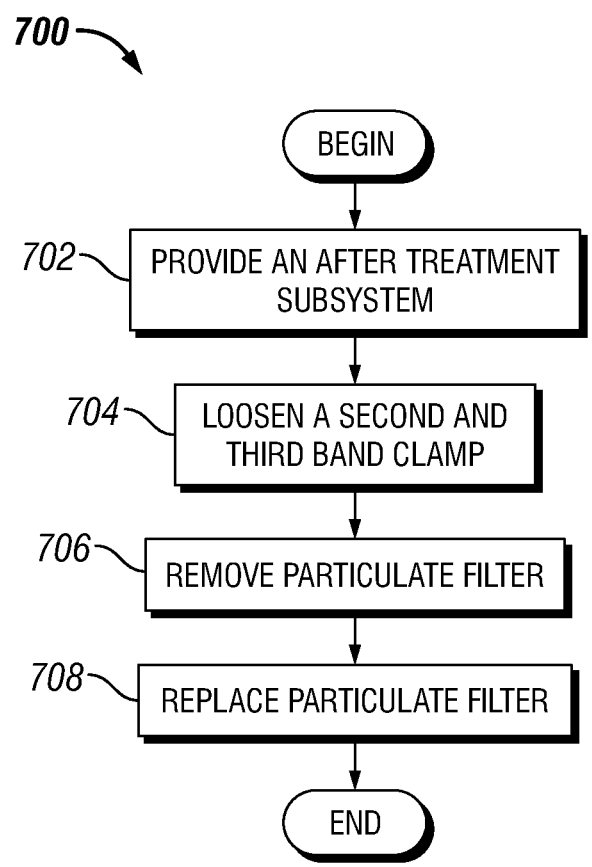
FIG. 7 is a schematic flow diagram of a procedure for servicing an aftertreatment system.

The schematic flow diagrams of FIGS. 6 and 7 illustrate exemplary procedures for integrating aftertreatment manifold devices (or end caps 116, 118). Operations illustrated are understood to be exemplary only, and operations may be combined or divided, and added or removed, as well as re-ordered in whole or part, unless stated explicitly to the contrary herein.

FIG. 6 is a schematic flow diagram of a procedure 600 for supplying an aftertreatment system. The procedure 600 includes providing an aftertreatment subsystem, including: interfaces including a first mounting interface, a second mounting interface, a fluid inlet interface, and a fluid outlet interface; aftertreatment components, each aftertreatment component having a corresponding central axis and axial extent, the aftertreatment components having a first end and an opposing second end.

The central axes for the plurality of aftertreatment components are within twenty degrees of parallel. At least a portion of the axial extents for the aftertreatment components are mutually shared. End cap(s) define fluid chamber(s) that fluidly couple outlet(s) of upstream aftertreatment component(s) with inlet(s) of downstream aftertreatment component(s), where each end cap is positioned at the first end or the second end of the upstream and downstream aftertreatment components. The fluid inlet interface is coupled to a first aftertreatment component and the fluid outlet interface is coupled to a last aftertreatment component.

The provided aftertreatment subsystem further includes a first bracket that joins the aftertreatment components at an axial position closer to the first end than to a center of the axial extent of any one of the plurality of aftertreatment components, a second bracket that joins the plurality of aftertreatment components at an axial position closer to the second end than to the center of the axial extent of any one of the plurality of aftertreatment components. The first bracket includes the first mounting interface and the second bracket includes the second mounting interface.

The procedure 600 further includes an operation 604 to provide an installation specification. The installation specification includes specification value(s) selected from: relative positions and attachment means specification of the first and second mounting interfaces, maximum dimensions of the joined aftertreatment components, a size and connection type for the fluid inlet interface, and/or a size and connection type for the fluid outlet interface.

In a further embodiment, the aftertreatment subsystem further includes a reductant injector interface positioned on one of the end caps, or positioned on a housing of one of the aftertreatment components. The aftertreatment subsystem further includes a wiring harness interface coupled to a housing of one of the plurality of aftertreatment components, and the installation specification further includes specification value(s) selected from: a position and connector type for the wiring harness interface, and an attachment means specification for the reductant injector.

FIG. 7 is a schematic flow diagram of a procedure 700 for servicing an aftertreatment subsystem. The procedure 700 includes an operation 702 to provide an aftertreatment subsystem and an operation 704 to loosen a second band clamp and a third band clamp. The procedure 700 further includes an operation 706 to remove a particulate filter from the aftertreatment subsystem and an operation 708 to replace the particulate filter.

FIG. 8 is a schematic illustration of an article 100 of manufacture. The article 100 includes a first bracket 102 having a first mounting interface 106, the first bracket 102 defining a first set of aftertreatment engagement features including at least a portion of each of a number of cross-sectional shapes. Referencing FIG. 10, the first bracket 102 includes a first cross-sectional shape 1002, a second cross-sectional shape 1004, and a third cross-sectional shape 1006. The cross-sectional shapes 1002, 1004, 1006 are sized to allow passage of an aftertreatment component therethrough. In the illustrations of FIGS. 8 and 10, the first cross-sectional shape 1002 is sized to allow passage of a third aftertreatment component 110, the second cross-sectional shape 1004 is sized to allow passage of a second aftertreatment component 114, and the third cross-sectional shape 1006 is sized to allow passage of a first aftertreatment component 112. The first bracket 102 in FIG. 10 is illustrated defining the entire cross-sectional shape for each aftertreatment component 110, 112, 114, but the first bracket 102 may include only a portion of each cross-sectional shape (e.g. refer to FIG. 11A and referencing text with respect to an embodiment of the second bracket 104). Referencing FIG. 9, a schematic cutaway drawing of a first bracket.102 is shown. The aftertreatment components 110, 112, 114 are inserted in the first bracket 102.

Figure 18:
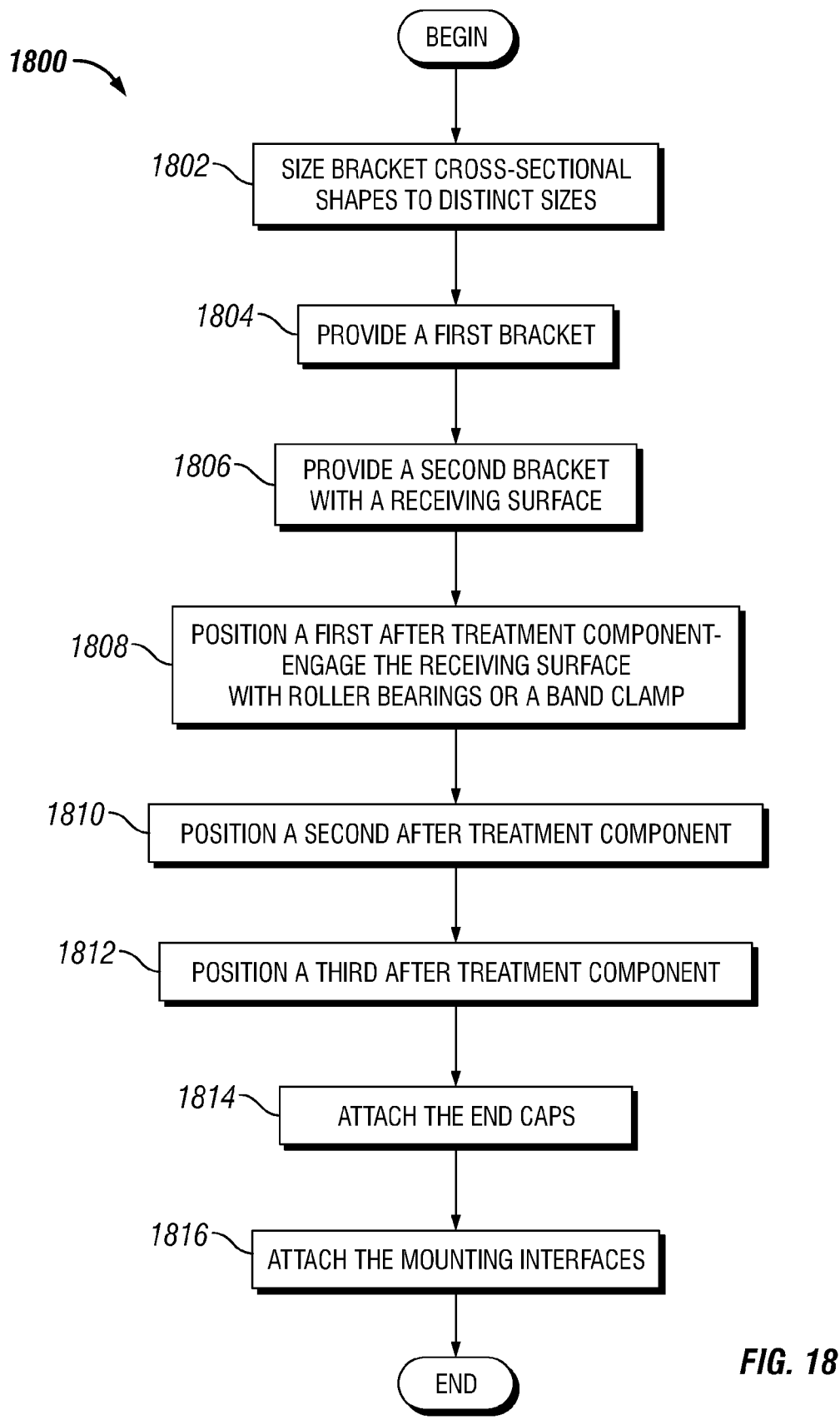
FIG. 18 is a schematic flow diagram of a procedure for installing an aftertreatment device with integrated mounting brackets.

The schematic flow diagrams of FIG. 18 illustrate one example of operations for installing an aftertreatment device with integrated mounting brackets. Operations illustrated are understood to be exemplary only, and operations may be combined or divided, and added or removed, as well as re-ordered in whole or part, unless stated explicitly to the contrary herein.

FIG. 18 is a schematic flow diagram of a procedure 1800 for installing an aftertreatment device with integrated mounting brackets. The procedure 1800 includes an operation 1802 to size a first cross-sectional shape corresponding to a first aftertreatment device, a second cross-sectional shape corresponding to a second aftertreatment device, and a third cross-sectional shape corresponding to a third aftertreatment device to distinct sizes. The procedure 1800 further includes an operation 1804 to provide a first bracket having a first mounting interface, the first bracket defining a first set of aftertreatment engagement features including at least a portion of a each of the first cross-sectional shape, the second cross-sectional shape, and the third cross-sectional shape. The procedure 1800 further includes an operation 1806 to provide a second bracket having a second mounting interface, the second bracket defining a second set of aftertreatment engagement features including at least a portion of a each of the first cross-sectional shape, the second cross-sectional shape, and the third cross-sectional shape. The operation 1806 to provide the second bracket further includes providing the second bracket with a receiving surface that extends in a perpendicular plane to the second set of aftertreatment engagement features, The procedure 1800 further includes an operation 1808 to position a first end of a first aftertreatment component in the first cross-sectional shape of the first bracket and a second end of the first aftertreatment component in the first cross-sectional shape of the second bracket. In certain embodiments, the operation 1808 to position the first aftertreatment component further includes attaching the first aftertreatment component to the receiving surface by engaging the receiving surface with roller bearings and/or a band clamp.

The procedure 1800 further includes an operation 1810 to position a first end of a second aftertreatment component in a second cross-sectional shape of the first bracket and a second end of the second aftertreatment component in the second cross-sectional shape of the second bracket. The procedure 1800 further includes an operation 1812 to position a first end of a third aftertreatment component in a third cross-sectional shape of the first bracket and a second end of the third aftertreatment component in the third cross-sectional shape of the second bracket.

The procedure 1800 further includes an operation 1814 to attach a first end cap that fluidly couples an outlet of the first aftertreatment component to an inlet of the second aftertreatment component, and to attach a second end cap that fluidly couples an outlet of the second aftertreatment component to an inlet of the third aftertreatment component. The procedure 1800 further includes an operation 1816 to attach the first mounting interface to a first mounting surface and to attach the second mounting interface to a second mounting surface.

As is evident from the figures and text presented above, a variety of embodiments according to the present invention are contemplated.

One exemplary embodiment is a system for treating exhaust gas of an internal combustion engine, including a first aftertreatment component having a first central axis and a first axial extent, a second aftertreatment component having a second central axis and a second axial extent, and a third aftertreatment component having a third central axis and a third axial extent. The first, second, and third central axes are substantially parallel. The second axial extent and the third axial extent are shared, partially or fully, with the first axial extent. The system includes a first end cap at a first end, the first end cap defining a first fluid chamber that fluidly couples an outlet of the first aftertreatment component with an inlet of the second aftertreatment component, and a second end cap at a second end, the second end cap defining a second fluid chamber that fluidly couples an outlet of the second aftertreatment component with an inlet of the third aftertreatment component.

The first end cap includes the cross-sectional area of the first aftertreatment component and the cross-sectional area of the second aftertreatment component. The second end cap includes the cross-sectional area of the second aftertreatment component and the cross-sectional area of the third aftertreatment component. In one embodiment, the system does not include pipe elbows. The exemplary system includes a sensor table mounted on a housing defining the third aftertreatment component, the sensor table comprising a wiring harness interface. A reductant injector may be present and structured to inject reductant into the first fluid chamber.

The exemplary system further includes a first bracket having a first mounting interface, where the first bracket joins the first aftertreatment component, the second aftertreatment component, and the third aftertreatment component at an axial position closer to the first end than to a center of the second axial extent. The system yet further includes a second bracket having a second mounting interface, where the second bracket joins the first aftertreatment component, the second aftertreatment component, and the third aftertreatment component at an axial position closer to the second end than to a center of the second axial extent. In certain embodiments, a band clamp attaches the first aftertreatment component to the second bracket. The first mounting interface and the second mounting interface may define a plane.

In an exemplary embodiment, the first aftertreatment component includes a diesel oxidation catalyst in series with a diesel particulate filter, the second aftertreatment component includes a flow pipe, and the third aftertreatment component includes a selective catalytic reduction catalyst in series with an ammonia oxidation catalyst. The first aftertreatment component may further include a fluid inlet interface that projects from the first aftertreatment component at the second end of the first aftertreatment component, and the third aftertreatment component further includes a fluid outlet interface that projects from the third aftertreatment component at the first end of the third aftertreatment component. The exhaust fluid flows through the first aftertreatment component and the third aftertreatment component in a first direction, and through the second aftertreatment component in a second direction.

Another exemplary embodiment is an aftertreatment subsystem including a plurality of interfaces. The interfaces include a first mounting interface, a second mounting interface, a fluid inlet interface, and a fluid outlet interface. The aftertreatment subsystem includes aftertreatment components, each aftertreatment component having a corresponding central axis and axial extent, the aftertreatment components having a first end and an opposing second end. The central axes for the plurality of aftertreatment components are within twenty degrees of parallel, and at least a portion of the axial extents for the plurality of aftertreatment components are mutually shared. The aftertreatment subsystem further includes an end cap(s) defining a fluid chamber that fluidly couples an outlet of an upstream aftertreatment component with an inlet of a downstream aftertreatment component. Each end cap is positioned at one of the first end and the second end of the upstream and downstream aftertreatment components. The fluid inlet interface is coupled to a first aftertreatment component and the fluid outlet interface is coupled to a last aftertreatment component.

The aftertreatment subsystem further includes a first bracket that joins the aftertreatment components at an axial position closer to the first end than to a center of the axial extent of any one of the aftertreatment components, and a second bracket that joins the aftertreatment components at an axial position closer to the second end than to the center of the axial extent of any one of the aftertreatment components. The first bracket includes the first mounting interface and the second bracket includes the second mounting interface.

In a further embodiment, the aftertreatment subsystem includes a reductant injector interface positioned one of the end caps, or on a housing of one of the aftertreatment components. In a yet further embodiment, the aftertreatment subsystem includes a wiring harness interface coupled to a housing of one of the aftertreatment components. In a further embodiment, the aftertreatment subsystem includes an installation specification having specification value(s) including: relative positions and attachment means specification of the first and second mounting interfaces, maximum dimensions of the joined aftertreatment components, position and connector type for the wiring harness interface, attachment means specification for the reductant injector, a size and connection type for the fluid inlet interface, and/or a size and connection type for the fluid outlet interface. In a still further embodiment, the aftertreatment subsystem does not include any other interfaces beyond the first mounting interface, the second mounting interface, the fluid inlet interface, the fluid outlet interface, the reductant injector interface, and the wiring harness interface.

In an exemplary embodiment, an exhaust fluid substantially reverses flow direction through each of the end cap(s). The first end may include a furthest extent of any of the aftertreatment components in a first axial direction, and the second end may include a furthest extent of any of the aftertreatment components in an opposite axial direction. In certain embodiments, the central axes for the plurality of aftertreatment components are parallel.

Another exemplary embodiment is a method including providing an aftertreatment subsystem, including: interfaces including a first mounting interface, a second mounting interface, a fluid inlet interface, and a fluid outlet interface; aftertreatment components, each aftertreatment component having a corresponding central axis and axial extent, the aftertreatment components having a first end and an opposing second end. The central axes for the plurality of aftertreatment components are within twenty degrees of parallel. At least a portion of the axial extents for the aftertreatment components are mutually shared. End cap(s) define fluid chamber(s) that fluidly couple outlet(s) of upstream aftertreatment component(s) with inlet(s) of downstream aftertreatment component(s), where each end cap is positioned at the first end or the second end of the upstream and downstream aftertreatment components. The fluid inlet interface is coupled to a first aftertreatment component and the fluid outlet interface is coupled to a last aftertreatment component.

The provided aftertreatment subsystem further includes a first bracket that joins the aftertreatment components at an axial position closer to the first end than to a center of the axial extent of any one of the plurality of aftertreatment components, a second bracket that joins the plurality of aftertreatment components at an axial position closer to the second end than to the center of the axial extent of any one of the plurality of aftertreatment components. The first bracket includes the first mounting interface and the second bracket includes the second mounting interface.

The method further includes providing an installation specification. The installation specification includes specification value(s) selected from: relative positions and attachment means specification of the first and second mounting interfaces, maximum dimensions of the joined aftertreatment components, a size and connection type for the fluid inlet interface, and/or a size and connection type for the fluid outlet interface.

In a further embodiment, the aftertreatment subsystem further includes a reductant injector interface positioned on one of the end caps, or positioned on a housing of one of the aftertreatment components. The aftertreatment subsystem further includes a wiring harness interface coupled to a housing of one of the plurality of aftertreatment components, and the installation specification further includes specification value(s) selected from: a position and connector type for the wiring harness interface, and an attachment means specification for the reductant injector.

Yet another exemplary embodiment is a method for servicing an aftertreatment system, including providing an aftertreatment subsystem. The method further includes loosening a second band clamp and a third band clamp, removing a particulate filter, and replacing the particulate filter.

The provided aftertreatment subsystem includes a first aftertreatment component having a first central axis and a first axial extent, a second aftertreatment component having a second central axis and a second axial extent, and a third aftertreatment component having a third central axis and a third axial extent, where the first, second, and third central axes are substantially parallel, and where at least a portion of the second axial extent and the third axial extent are shared with the first axial extent. The aftertreatment subsystem further includes a first end cap at a first end, the first end cap defining a first fluid chamber that fluidly couples an outlet of the first aftertreatment component with an inlet of the second aftertreatment component, and a second end cap at a second end, the second end cap defining a second fluid chamber that fluidly couples an outlet of the second aftertreatment component with an inlet of the third aftertreatment component. The aftertreatment subsystem further includes a first bracket having a first mounting interface, where the first bracket joins the first aftertreatment component, the second aftertreatment component, and the third aftertreatment component at an axial position closer to the first end than to a center of the second axial extent, and a second bracket having a second mounting interface, where the second bracket joins the first aftertreatment component, the second aftertreatment component, and the third aftertreatment component at an axial position closer to the second end than to a center of the second axial extent. The first aftertreatment component includes an oxidation catalyst and a particulate filter, where a first band clamp attaches the oxidation catalyst to the second bracket, where a second band clamp attaches the oxidation catalyst to the particulate filter, and where a third band clamp attaches the particulate filter to the first bracket.

One exemplary embodiment is an article of manufacture including a first bracket having a first mounting interface, the first bracket defining a first set of aftertreatment engagement features including at least a portion of each of a number of cross-sectional shapes. The article further includes a second bracket having a second mounting interface, the second bracket defining a second set of aftertreatment engagement features, the second set of engagement features including at least a portion of each of the number of cross-sectional shapes. The cross-sectional shapes are sized to allow passage of an aftertreatment component therethrough. The first bracket and second bracket are structured such that, when the first mounting interface is mounted on a first mounting surface and the second mounting interface is mounted on a second mounting surface, the cross-sectional shapes of the first bracket align with the cross-sectional shapes of the second bracket.

In a further embodiment, the first mounting surface and the second mounting surface define a plane. The number of cross-sectional shapes, in certain embodiments, include a first circle sized to allow passage of a selective-reduction catalyst housing, a second circle sized to allow passage of a diesel particulate filter housing, and a third circle sized to allow passage of a flow tube housing. The exemplary article includes the second bracket further having a receiving surface that extends around at least a portion of an edge of one of the cross-sectional shapes, in a perpendicular plane to the one of the cross-sectional shapes. In a further embodiment, each of the first and second brackets further include means for attaching a lifting device. In a further embodiment, the first mounting surface and the second mounting surface define a plane.

The exemplary article includes each of the first and second brackets further including means for enforcing directional installation of aftertreatment components. One exemplary embodiment includes each of the cross-sectional shapes having a distinct size.

Another exemplary embodiment is a kit for installing an aftertreatment system package. The kit includes a first aftertreatment component having a first cross-sectional shape, a second aftertreatment component having a second cross-sectional shape, and a third aftertreatment component having a third cross-sectional shape. The kit includes a first bracket having a first mounting interface, where the first bracket defines a first set of aftertreatment engagement features.

The first set of aftertreatment engagement features includes at least a portion of each of the first cross-sectional shape, the second cross-sectional shape, and the third cross-sectional shape. The kit includes a second bracket having a second mounting interface, where the second bracket defines a second set of aftertreatment engagement features. The second set of aftertreatment engagement features includes at least a portion of a each of the first cross-sectional shape, the second cross-sectional shape, and the third cross-sectional shape. The first bracket and second bracket are structured such that, when the first mounting interface is mounted on a first mounting surface and the second mounting interface is mounted on a second mounting surface, the cross-sectional shapes of the first bracket align with the cross-sectional shapes of the second bracket.

In a further embodiment, the first mounting surface and the second mounting surface define a plane. In certain embodiments, the second bracket further includes a receiving surface that extends in a perpendicular plane to the second set of aftertreatment engagement features, and the first aftertreatment component engages the receiving surface with a plurality of roller bearings.

The exemplary kit includes the first aftertreatment component as a diesel particulate filter, the second aftertreatment component as a flow tube, which may be a decomposition tube, and the third particulate component is a selective oxidation catalyst. The first and second brackets further include means for attaching a lifting device. Each of the first and second brackets further include means for enforcing directional installation of aftertreatment components. In certain embodiments, the first cross-sectional shape, second cross-sectional shape, and third cross-sectional shape each have a distinct size. The kit further includes a first end cap that fluidly couples an outlet of the first aftertreatment component to an inlet of the second aftertreatment component, and a second end cap that fluidly couples an outlet of the second aftertreatment component to an inlet of the third aftertreatment component.

Yet another exemplary embodiment is a method including providing a first bracket having a first mounting interface, the first bracket defining a first set of aftertreatment engagement features including at least a portion of a each of the first cross-sectional shape, the second cross-sectional shape, and the third cross-sectional shape. The method further includes providing a second bracket having a second mounting interface, the second bracket defining a second set of aftertreatment engagement features including at least a portion of a each of the first cross-sectional shape, the second cross-sectional shape, and the third cross-sectional shape. The exemplary method further includes sizing the first cross-sectional shape, the second cross-sectional shape, and the third cross-sectional shape to distinct sizes.

The method further includes positioning a first end of a first aftertreatment component in the first cross-sectional shape of the first bracket and a second end of the first aftertreatment component in the first cross-sectional shape of the second bracket. The method further includes positioning a first end of a second aftertreatment component in a second cross-sectional shape of the first bracket and a second end of the second aftertreatment component in the second cross-sectional shape of the second bracket. The method further includes positioning a first end of a third aftertreatment component in a third cross-sectional shape of the first bracket and a second end of the third aftertreatment component in the third cross-sectional shape of the second bracket. The method includes attaching the first mounting interface to a first mounting surface and attaching the second mounting interface to a second mounting surface.

The method further includes attaching a first end cap that fluidly couples an outlet of the first aftertreatment component to an inlet of the second aftertreatment component, and attaching a second end cap that fluidly couples an outlet of the second aftertreatment component to an inlet of the third aftertreatment component. The method further includes providing the second bracket with a receiving surface that extends in a perpendicular plane to the second set of aftertreatment engagement features, where the first aftertreatment component engages the receiving surface with a plurality of roller bearings. In a further embodiment, the method further includes providing the second bracket further with a receiving surface that extends in a perpendicular plane to the second set of aftertreatment engagement features, and attaching the first aftertreatment component to the receiving surface with a band clamp.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for treating exhaust gas of an internal combustion engine, comprising:
a first aftertreatment component having a first central axis and a first axial extent, a second aftertreatment component having a second central axis and a second axial extent, and a third aftertreatment component having a third central axis and a third axial extent;
wherein the first, second, and third central axes are substantially parallel;
wherein at least a portion of the second axial extent and the third axial extent are shared with the first axial extent;
a first end cap at a first end, the first end cap defining a first fluid chamber that fluidly couples an outlet of the first aftertreatment component with an inlet of the second aftertreatment component;
a second end cap at a second end, the second end cap defining a second fluid chamber that fluidly couples an outlet of the second aftertreatment component with an inlet of the third aftertreatment component; and a first bracket having a first mounting interface, wherein the first bracket joins the first aftertreatment component, the second aftertreatment component, and the third aftertreatment component at an axial position closer to the first end than to a center of the second axial extent, the first bracket defining a first cross-sectional shape sized so as to allow passage of the first aftertreatment component therethrough, a second cross-sectional shape sized so as to allow passage of the second aftertreatment component therethrough and a third cross-sectional shape sized so as to allow passage of the third aftertreatment component therethrough such that the first bracket encircles each of the first aftertreatment component, the second aftertreatment component and the third aftertreatment component.

2. The system of claim 1, wherein the first end cap comprises the cross-sectional area of the first aftertreatment component and the cross-sectional area of the second aftertreatment component.

3. The system of claim 1, wherein the second end cap comprises the cross-sectional area of the second aftertreatment component and the cross-sectional area of the third aftertreatment component.

4. The system of claim 1, wherein the system does not include pipe elbows.

5. The system of claim 1, further comprising a sensor table mounted on a housing defining the third aftertreatment component, the sensor table comprising a wiring harness interface.

6. The system of claim 1, further comprising a reductant injector structured to inject reductant into the first fluid chamber.

7. The system of claim 1, further comprising a second bracket having a second mounting interface, wherein the second bracket joins the first aftertreatment component, the second aftertreatment component, and the third aftertreatment component at an axial position closer to the second end than to a center of the second axial extent.

8. The system of claim 7, wherein a band clamp attaches the first aftertreatment component to the second bracket.

9. The system of claim 7, wherein the first mounting interface and the second mounting interface define a plane.

10. The system of claim 1, wherein the first aftertreatment component comprises a diesel oxidation catalyst in series with a diesel particulate filter, wherein the second aftertreatment component comprises a flow pipe, and wherein the third aftertreatment component comprises a selective catalytic reduction catalyst in series with an ammonia oxidation catalyst.

11. The system of claim 1, wherein the first aftertreatment component further comprises a fluid inlet interface that projects from the first aftertreatment component at the second end of the first aftertreatment component, and wherein the third aftertreatment component further comprises a fluid outlet interface that projects from the third aftertreatment component at the first end of the third aftertreatment component.

12. The system of claim 1, wherein an exhaust fluid flows through the first aftertreatment component and the third aftertreatment component in a first direction, and wherein the exhaust fluid flows through the second aftertreatment component in a second direction.

13. An aftertreatment subsystem comprising:
a plurality of interfaces comprising a first mounting interface, a second mounting interface, a fluid inlet interface, and a fluid outlet interface;
a plurality of aftertreatment components, each aftertreatment component having a corresponding central axis and axial extent, the aftertreatment components having a first end and an opposing second end;
wherein the central axes for the plurality of aftertreatment components are within twenty degrees of parallel;
wherein at least a portion of the axial extents for the plurality of aftertreatment components are mutually shared;
at least one end cap defining a fluid chamber that fluidly couples an outlet of an upstream aftertreatment component with an inlet of a downstream aftertreatment component, wherein each end cap is positioned at one of the first end and the second end of the upstream and downstream aftertreatment components;
wherein the fluid inlet interface is coupled to a first aftertreatment component and the fluid outlet interface is coupled to a last aftertreatment component;
a first bracket that joins the plurality of aftertreatment components at an axial position closer to the first end than to a center of the axial extent of any one of the plurality of aftertreatment components, the first bracket defining a plurality of cross-sectional shapes corresponding to each of the plurality of aftertreatment components, the plurality of cross-sectional shapes structured so as to allow passage of a corresponding aftertreatment component of the plurality of aftertreatment components therethrough such that the first bracket encircles each of the plurality of aftertreatment components;
a second bracket that joins the plurality of aftertreatment components at an axial position closer to the second end than to the center of the axial extent of any one of the plurality of aftertreatment components; and
wherein the first bracket comprises the first mounting interface and wherein the second bracket comprises the second mounting interface.

14. The aftertreatment subsystem of claim 13, further comprising a reductant injector interface positioned on one of:
one of the at least one end caps; and
a housing of one of the plurality of aftertreatment components.

15. The aftertreatment subsystem of claim 14, further comprising a wiring harness interface coupled to a housing of one of the plurality of aftertreatment components.

16. The aftertreatment system of claim 15, wherein the aftertreatment subsystem does not include any other interfaces.

17. The aftertreatment system of claim 13, wherein an exhaust fluid substantially reverses flow direction through each of the at least one end cap.

18. The aftertreatment system of claim 13, wherein the first end comprises a furthest extent of any of the aftertreatment components in a first axial direction, and wherein the second end comprises a furthest extent of any of the aftertreatment components in an opposite axial direction.

19. The aftertreatment system of claim 13, wherein the central axes for the plurality of aftertreatment components are parallel.

20. A method, comprising:
providing an aftertreatment subsystem comprising:
a plurality of interfaces comprising a first mounting interface, a second mounting interface, a fluid inlet interface, and a fluid outlet interface;
a plurality of aftertreatment components, each aftertreatment component having a corresponding central axis and axial extent, the aftertreatment components having a first end and an opposing second end;

wherein the central axes for the plurality of aftertreatment components are within twenty degrees of parallel;

wherein at least a portion of the axial extents for the plurality of aftertreatment components are mutually shared;

at least one end cap defining a fluid chamber that fluidly couples an outlet of an upstream aftertreatment component with an inlet of a downstream aftertreatment component, wherein each end cap is positioned at one of the first end and the second end of the upstream and downstream aftertreatment components;

wherein the fluid inlet interface is coupled to a first aftertreatment component and the fluid outlet interface is coupled to a last aftertreatment component;

a first bracket that joins the plurality of aftertreatment components at an axial position closer to the first end than to a center of the axial extent of any one of the plurality of aftertreatment components, the first bracket defining a plurality of cross-sectional shapes corresponding to each of the plurality of aftertreatment components, the plurality of cross-sectional shapes each structured so as to allow passage of a corresponding aftertreatment component of the plurality of aftertreatment components therethrough such that the first bracket encircles each of the plurality of aftertreatment components;

a second bracket that joins the plurality of aftertreatment components at an axial position closer to the second end than to the center of the axial extent of any one of the plurality of aftertreatment components;

wherein the first bracket comprises the first mounting interface and wherein the second bracket comprises the second mounting interface; and providing an installation specification comprising at least one specification value selected from the specification values consisting of: relative positions and attachment means specification of the first and second mounting interfaces, maximum dimensions of the joined aftertreatment components, a size and connection type for the fluid inlet interface, and a size and connection type for the fluid outlet interface.

21. The method of claim 20, wherein:

the aftertreatment subsystem further comprises:

a reductant injector interface positioned on one of: one of the at least one end caps, and a housing of one of the plurality of aftertreatment components;

a wiring harness interface coupled to a housing of one of the plurality of aftertreatment components; and the installation specification further comprises at least one specification value selected from the specification values consisting of: position and connector type for the wiring harness interface, and attachment means specification for the reductant injector.

22. A method for servicing an aftertreatment system, comprising:

providing an aftertreatment subsystem comprising:

a first aftertreatment component having a first central axis and a first axial extent, a second aftertreatment component having a second central axis and a second axial extent, and a third aftertreatment component having a third central axis and a third axial extent, wherein the first, second, and third central axes are substantially parallel, and wherein at least a portion of the second axial extent and the third axial extent are shared with the first axial extent;

a first end cap at a first end, the first end cap defining a first fluid chamber that fluidly couples an outlet of the first aftertreatment component with an inlet of the second aftertreatment component;

a second end cap at a second end, the second end cap defining a second fluid chamber that fluidly couples an outlet of the second aftertreatment component with an inlet of the third aftertreatment component;

a first bracket having a first mounting interface, wherein the first bracket joins the first aftertreatment component, the second aftertreatment component, and the third aftertreatment component at an axial position closer to the first end than to a center of the second axial extent, the first bracket defining a first cross-sectional shape sized so as to allow passage of the first aftertreatment component therethrough, a second cross-sectional shape sized so as to allow passage of the second aftertreatment component therethrough and a third cross-sectional shape sized so as to allow passage of the third aftertreatment component therethrough such that the first bracket encircles each of the first aftertreatment component, the second aftertreatment component and the third aftertreatment component; and a second bracket having a second mounting interface, wherein the second bracket joins the first aftertreatment component, the second aftertreatment component, and the third aftertreatment component at an axial position closer to the second end than to a center of the second axial extent; and wherein the first aftertreatment component comprises an oxidation catalyst and a particulate filter, wherein a first band clamp attaches the oxidation catalyst to the second bracket, wherein a second band clamp attaches the oxidation catalyst to the particulate filter, and wherein a third band clamp attaches the particulate filter to the first bracket;

loosening the second band clamp and the third band clamp;

removing the particulate filter; and replacing the particulate filter.

23. A kit for installing an aftertreatment system package, the kit comprising:

a first aftertreatment component having a first cross-sectional shape, a second aftertreatment component having a second cross-sectional shape, and a third aftertreatment component having a third cross-sectional shape;

a first bracket comprising a first mounting interface, the first bracket defining a first set of aftertreatment engagement features comprising at least a portion of a each of the first cross-sectional shape, the second cross-sectional shape, and the third cross-sectional shape;

a second bracket comprising a second mounting interface, the second bracket defining a second set of aftertreatment engagement features comprising at least a portion of a each of the first cross-sectional shape, the second cross-sectional shape, and the third cross-sectional shape;

wherein the first bracket and second bracket are structured such that, when the first mounting interface is mounted on a first mounting surface and the second mounting interface is mounted on a second mounting surface, the cross-sectional shapes of the first bracket align with the cross-sectional shapes of the second bracket, and wherein the second bracket further comprises a receiving surface that extends in a perpendicular plane to the second set of aftertreatment engagement features and wherein the first aftertreatment component engages the receiving surface with a plurality of roller bearings.

24. The kit of claim 23, wherein the first mounting interface and the second mounting interface are structured to mount on the first mounting surface and the second mounting surface that define a plane.

25. The kit of claim 23, wherein the first aftertreatment component comprises a diesel particulate filter, wherein the second aftertreatment component comprises a flow tube, and wherein the third particulate component comprises a selective oxidation catalyst.

26. The kit of claim 23, wherein each of the first and second brackets further comprise means for attaching a lifting device.

27. The kit of claim 23, wherein each of the first and second brackets further comprise means for enforcing directional installation of aftertreatment components.

28. The kit of claim 23, wherein the first cross-sectional shape, second cross-sectional shape, and third cross-sectional shape each comprise a distinct size.

29. The kit of claim 23, further comprising a first end cap that fluidly couples an outlet of the first aftertreatment component to an inlet of the second aftertreatment component, and a second end cap that fluidly couples an outlet of the second aftertreatment component to an inlet of the third aftertreatment component.

\* \* \* \* \*